United States Patent [19]

Usui

[11] Patent Number: 4,982,765

[45] Date of Patent: Jan. 8, 1991

[54] FLEXIBLE COMPOSITE HOSE

[75] Inventor: Masayoshi Usui, Numazu, Japan

[73] Assignee: Usui Kokusai Sangyo Kaisha Ltd., Japan

[21] Appl. No.: 538,218

[22] Filed: Jun. 14, 1990

Related U.S. Application Data

[63] Continuation of Ser. No. 388,128, Jul. 31, 1989, abandoned, which is a continuation of Ser. No. 185,517, Apr. 25, 1988, abandoned.

[51] Int. Cl.$^5$ ............................................. F16L 11/08
[52] U.S. Cl. ..................................... 138/122; 138/129; 138/133; 138/174; 428/34.9; 174/47
[58] Field of Search ............... 138/121, 122, 129, 132, 138/137, 141, 143, 172, 173, 174, 177, 103, 133; 156/143, 144, 86; 174/47, DIG. 8; 428/34.9

[56] References Cited

U.S. PATENT DOCUMENTS

| | | | |
|---|---|---|---|
| 2,936,812 | 5/1960 | Roberts | 138/122 |
| 3,023,787 | 3/1962 | Phillips et al. | |
| 3,091,261 | 5/1963 | Waddell, Jr. | |
| 3,152,618 | 10/1964 | Rothermel et al. | 138/122 |
| 3,157,543 | 11/1964 | Roberts et al. | 138/122 |
| 3,243,211 | 3/1966 | Wetmore | |
| 3,279,502 | 10/1966 | Waddell, Jr. | |
| 3,834,423 | 9/1974 | Elson | 138/122 |
| 4,098,298 | 7/1978 | Vohrer | |
| 4,194,081 | 3/1986 | Medford et al. | 138/121 |
| 4,578,855 | 4/1986 | Hagen | 138/122 |
| 4,620,569 | 11/1986 | Von Glanstätten et al. | |

FOREIGN PATENT DOCUMENTS 743743 1/1956 United Kingdom.

Primary Examiner—James E. Bryant, III
Attorney, Agent, or Firm—Anthony J. Casella; Gerald E. Hespos

[57] ABSTRACT

A flexible composite hose comprises an inner tube formed from a synthetic resin, an outer tube formed from a thermally shrinkable synthetic resin, having a relatively small wall thickness and carrying an adhesive on its inner peripheral surface, and a metal wire interposed spirally between the inner and outer tubes. The adhesive and the thermal shrinkage of the thermally shrinkable resin cause the inner peripheral surface of the outer tube to stick closely to the inner tube and the wire. The outer tube has a spirally corrugated outer peripheral surface defined by the wire.

7 Claims, 1 Drawing Sheet

FLEXIBLE COMPOSITE HOSE

This application is a continuation of prior application Ser. No. 388,128, now abandoned, filed July 31, 1989, and which in turn was a continuation of application Ser. No. 185,517 which was filed Apr. 25, 1988, now abandoned.

BACKGROUND OF THE INVENTION

1. Field of the Invention:

This invention relates to a flexible composite hose formed from a synthetic resin, having a relatively small diameter and used to form a complicatedly curved oil or gas passageway in a narrow space in an automobile or any of various kinds of machines or apparatus.

2. Description of the Prior Art:

A known flexible composite hose of the type to which this invention pertains includes an inner tube formed from a synthetic resin and having an outer peripheral surface about which a wire is spirally wound. An adhesive tape is used for causing the wire to stick to the outer periphery of the inner tube. A woven or knitted member covers the inner tube including the wire and the adhesive tape. It further includes an outer tube formed about the woven or knitted member by coating it with a molten synthetic resin and having a relatively large wall thickness. The outer tube has a smooth outer peripheral surface.

The manufacture of the known hose as hereinabove described, however, requires a complicated process It includes the separate steps of applying the adhesive tape, the woven or knitted member and the molten resin forming the outer tube. The hose is, therefore, expensive. Moreover, the relatively large wall thickness of the outer tube and its smooth outer peripheral surface often cause the hose to collapse and form a blocked passageway where it is curved in a complicatedly way.

SUMMARY OF THE INVENTION

It is, therefore, an object of this invention to provide an improved flexible composite hose which can be fabricated easily at a low cost without requiring any adhesive tape, or any woven or knitted member, and which is sufficiently flexible to form a complicatedly curved fluid passageway without collapsing at all.

This object is attained by a hose comprising an inner tube formed from a synthetic resin, an outer tube formed from a thermally shrinkable synthetic resin, having a relatively small wall thickness and carrying an adhesive on its inner peripheral surface, and a metal wire interposed spirally between the inner and outer tubes, the adhesive and the thermal shrinkage of the thermally shrinkable resin causing the inner peripheral surface of the outer tube to stick closely to the inner tube and the wire, the outer tube having a spirally corrugated outer peripheral surface defined by the wire. The wire preferably has a spiral pitch which is 1.5 to 3.0 times as large as its diameter.

The hose of this invention is easy and inexpensive to manufacture, as the thermally shrinkable synthetic resin is caused to shrink, and the adhesive melted, if the outer tube having a relatively small wall thickness is passed through a heating furnace after it has been applied about the inner tube and the wire. The adhesive causes the outer tube to stick substantially to only the radially outer portions of the wire and the outer tube has a corrugated wall forming a spiral pattern along the wire. These features ensure the satisfactory flexibility of the hose and enable it to form a complicatedly curved fluid passageway in a narrow space without collapsing.

DETAILED DESCRIPTION OF THE INVENTION

Figure 1:
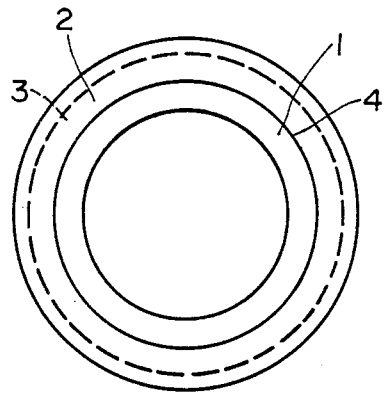
FIG. 1 is an enlarged front elevational view of a flexible composite hose embodying this invention.
Figure 2:
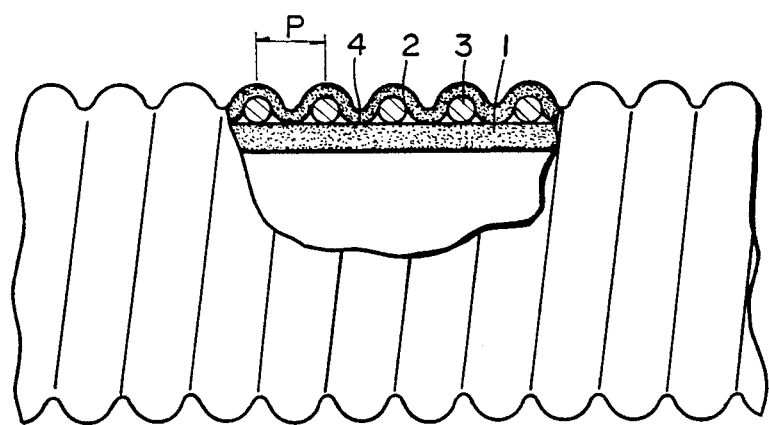
FIG. 2 is a fragmentary side elevational view, partly in section, of the hose shown in FIG. 1.

A composite hose embodying this invention is shown by way of example in the drawing. It includes an inner tube 1 formed from a synthetic resin, such as nylon or teflon, and having an outer peripheral surface about which a metal wire 3, such as a stainless steel wire or a piano wire, is spirally wound. The wire 3 preferably has a pitch P which is 1.5 to 3.0 times as large as its diameter. This range of pitch is preferred for ensuring the reinforcement of the hose and its flexibility.

The hose further includes an outer tube 2 covering the inner tube 1 and the wire 3. The outer tube 2 is formed from a thermally shrinkable synthetic resin, such as a crosslinked polyolefin resin, or fluorine-containing resin, and has a relatively small wall thickness. The outer tube 2 has an inner peripheral surface provided with an adhesive 4 of the type which can be melted by heat. If the assembly of the inner tube, wire, and outer tube is heated, the adhesive is melted and the thermally shrinkable resin is caused to shrink, so that the outer tube 2 may stick closely to the inner tube 1 and the wire 3 and form a spirally corrugated wall thereon. This work is very easy to accomplish only if the assembly in a straight form is passed through a heating furnace.

What is claimed is:

1. A flexible composite hose formed by the process comprising the steps of:
   providing an inner tube formed from a synthetic resin;
   placing a spirally formed metal wire about and in engagement with the inner tube and spirally formed metal wire having a pitch approximately 1.5 to 3.0 times the diameter of the metal wire;
   placing an outer tube formed from a thermally shrinkable resin having an inner peripheral surface with an adhesive thereon over the inner tube and the wire; and
   subjecting at least the outer tube to heat for melting the adhesive and shrinking the outer tube such that the adhesive adheres substantially to only portions of the inner tube intermediate coils of the spirally formed metal wire and to radially outer portions of the metal wire for providing a secure integral hose structure, radially inner portions of the metal wire being in face to face contact with the inner tube and areas intermediate the metal wire and the inner tube are substantially free of adhesive for insuring flexibility of the composite hose and for preventing collapse of the composite hose.

2. A flexible composite hose as in claim 1 wherein the outer tube is of substantially uniform thickness.

3. A flexible composite hose as in claim 1 wherein the inner tube is formed from nylon.

4. A flexible composite hose as in claim 1 wherein the inner tube is formed from teflon.

5. A flexible composite hose as in claim 1 wherein the metal wire is a stainless steel wire.

6. A flexible composite hose as in claim 1 wherein the outer tube is formed from a crosslinked polyolefin resin.

7. A flexible composite hose as in claim 1 wherein the outer tube is formed from a fluorine-containing resin.

* * * * *